(12) United States Patent
Viswanathan et al.

(10) Patent No.: US 7,836,403 B2
(45) Date of Patent: Nov. 16, 2010

(54) PERSISTENT DASHBOARD FOR USER INTERFACE

(75) Inventors: Sabarivasan Viswanathan, San Mateo, CA (US); Katherine H. Mobley, Palo Alto, CA (US); Carl P. Keller, Danville, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1266 days.

(21) Appl. No.: 10/185,180

(22) Filed: Jun. 27, 2002

(65) Prior Publication Data

US 2007/0198944 A1 Aug. 23, 2007

(51) Int. Cl.
*G06F 3/00* (2006.01)
*H04M 1/56* (2006.01)

(52) U.S. Cl. .................... 715/745; 715/708; 715/709; 715/733; 715/739; 715/781; 715/788; 715/789; 715/790; 715/791; 379/142.01; 379/142.04; 379/142.06

(58) Field of Classification Search ............ 715/738, 715/739, 777, 781, 804, 809, 810, 821, 841, 715/843, 513–517, 500, 526, 745; 717/115–117; 707/3, 104.1; 705/35, 39, 42, 43, 5, 1, 26; 379/142.06

See application file for complete search history.

(56) References Cited

U.S. PATENT DOCUMENTS

| | | | | |
|---|---|---|---|---|
| 5,732,229 A | * | 3/1998 | Dickinson .................... | 715/764 |
| 5,819,263 A | * | 10/1998 | Bromley et al. ................ | 707/3 |
| 5,822,410 A | * | 10/1998 | McCausland et al. .. | 379/114.01 |
| 5,835,084 A | * | 11/1998 | Bailey et al. ................ | 715/783 |
| 5,953,406 A | * | 9/1999 | LaRue et al. ........... | 379/265.01 |
| 5,974,135 A | * | 10/1999 | Breneman et al. ...... | 379/265.04 |
| 6,100,873 A | * | 8/2000 | Bayless et al. .............. | 345/593 |
| 6,285,364 B1 | * | 9/2001 | Giordano et al. ............ | 715/804 |
| 6,292,555 B1 | * | 9/2001 | Okamoto ................ | 379/265.01 |
| 6,404,884 B1 | * | 6/2002 | Marwell et al. ........ | 379/265.13 |

(Continued)

FOREIGN PATENT DOCUMENTS

EP  1143667 A2 * 10/2001

(Continued)

OTHER PUBLICATIONS

Microsoft, MS Outlook 2000 SP-3, 2000, Microsoft Corp, 9.0.0. 6627.*

(Continued)

*Primary Examiner*—Alvin Tan
(74) *Attorney, Agent, or Firm*—Campbell Stephenson LLP

(57) ABSTRACT

A method, user interface module, application program interface, computer program product and system that provides access to context information in a display window that remains persistent as the user navigates the application and views application data. The persistent dashboard can be populated from a communications event, such as an inbound telephone call; from data entered by the customer service agent via the user interface, such as a response to one of a series of scripted questions; from search results of a user-initiated search; or from application data displayed in a display window of the user interface. Various types of information from enterprise databases can be captured in the persistent dashboard to address the enterprise's business processes and needs. Information displayed in the persistent dashboard is configurable.

24 Claims, 8 Drawing Sheets

U.S. PATENT DOCUMENTS

| | | | |
|---|---|---|---|
| 6,526,397 B2 * | 2/2003 | Chee et al. | 707/1 |
| 6,625,139 B2 * | 9/2003 | Miloslavsky et al. | 370/352 |
| 6,668,276 B1 * | 12/2003 | Ohkado et al. | 709/217 |
| 6,687,241 B1 * | 2/2004 | Goss | 370/352 |
| 6,826,745 B2 * | 11/2004 | Coker et al. | 717/115 |
| 6,874,119 B2 * | 3/2005 | Macleod Beck et al. | 715/500.1 |
| 7,107,068 B2 | 9/2006 | Benzon et al. | 455/466 |
| 7,272,716 B2 | 9/2007 | Haller et al. | 713/156 |
| 2004/0151300 A1 * | 8/2004 | Marwell et al. | 379/265.13 |
| 2005/0117733 A1 * | 6/2005 | Widger et al. | 379/221.05 |
| 2006/0047568 A1 | 3/2006 | Eisenberg et al. | 705/14 |
| 2007/0094135 A1 | 4/2007 | Moore et al. | 705/40 |
| 2007/0127693 A1 | 6/2007 | D'Ambrosio et al. | 379/265.06 |
| 2009/0225967 A1 * | 9/2009 | Koch | 379/142.06 |

FOREIGN PATENT DOCUMENTS

WO      WO02003292 A2 * 10/2002

OTHER PUBLICATIONS

"Proposal for CRM thru SMS," retrieved on Feb. 19, 2009, available via the Internet at http://web.archive.org/web/20060507112137/http://www.positivecomsol.com/pdf/smsbankingbrief.pdf, 3 pp.

"Contact," Applied Business Technologies Copyright © 2001-2007, available via the Internet at http://www.appliedcorp.com/messaging/call_center.html, 3 pp.

"Wells Fargo Launches Mobile Text Banking Service," Wells Fargo, Oct. 22, 2007, available via the Internet at http://www.businesswire.com/portal/site/home/index.jsp?epi-content=News_View_Popup_Type&newsId=20071022005465&ndmHsc=v2*A119045880 0000*B1193086736000*DgroupByDate*J2*L1*N1000837*Zmobile%2520banking%2520wells%2520fargo&newsLang=en&beanID=202776713&viewID=news_view_popup, 2 pp.

"The First CRM Text Messaging Solution for Auto Dealers," Feb. 9, 2008, available via the Internet at http://cardealerforums.com/products-technology/t127531-first-crm-text-messaging-solution-auto-dealers.html, 2 pp.

"Mobile Reply—CRM by SMS," retrieved on Feb. 19, 2009, available via the Internet at http://www.mobilereply.com/crm.html, 5 pp.

"mBlox—Call centers," © 2009 mBlox Inc., available via the Internet at http://www.mblox.com/solutions/mobile-business/call-centers.php, 2 pp.

"Applications—text messaging," Copyright © 2004-2008 Blast Companies L.L.C., available via the Internet at http://www.blastcompanies.com/broadcast-messaging-applications/text_messaging.htm, 4 pp.

"SuiteSMS," Copyright © 2008 Advanced Telecom Services, available via the Internet at http://www.advancedtele.com/mobile-content.htm?page=nav, 2 pp.

Paul Greenberg, "CRM—Anytime, Anywhere," retrieved on Feb. 19, 2009, available via the Internet at http://www.blackberry.com/solutions/resources/CRM_for_the_Professional_on_the_Go_v1.pdf, 14 pp.

* cited by examiner

PERSISTENT DASHBOARD FOR USER INTERFACE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

User interfaces are becoming increasingly sophisticated by allowing access to numerous types of application data and/or application systems. For example, a typical customer service application may include a user interface to allow a customer service agent to navigate among a variety of types of data related to a customer. Such customer data may include contact information, service request information, order information, activity information, and so on. A customer service agent interacting with a customer may need to navigate quickly all of these types of information during, for example, the course of a single telephone conversation.

In order to provide personalized service, it is desirable that customer service agents appear to "know" the customer immediately when starting an interaction and throughout its duration. Since customer service centers receive a large volume and variety of customer interactions during a typical day, each agent needs to have quick access to important customer information, such as contact name, account number, phone number, and so on. However, even though changing application systems and/or between types of application data may be possible using a single user interface, typically no context information is provided by the user interface as the user navigates from one area to another. Often, the customer service agent writes down the customer's name, telephone number, or other important context information to remember while the agent navigates the customer's data. This workaround hinders agent productivity and can lead to dissatisfactory customer interactions when such critical information is not available and the agent must ask the customer to repeat information.

What is needed is a customizable user interface that can provide persistent context information while a user navigates among different screens and views of the user interface and/or different types of application data.

SUMMARY OF THE INVENTION

A persistent dashboard provides access to key context information in a display window that remains persistent as the user navigates the application and views application data. The persistent dashboard can be populated from a communications event, such as an inbound telephone call; from data entered by the customer service agent via the user interface, such as a response to one of a series of scripted questions; from search results of a user-initiated search; or from application data displayed in a display window of the user interface. For example, for an inbound telephone call, the persistent dashboard can be populated immediately with information regarding the caller, so that the agent has instant information about the caller even before he answers the call. Various types of information from enterprise databases can be captured in the persistent dashboard to address the enterprise's business processes and needs. Information displayed in the persistent dashboard is configurable.

In one feature, a method includes pushing context information for display in a first display window of a user interface in response to a first change in context and maintaining the context information for display in the first display window until a second change in context occurs.

In another feature, a system includes means for pushing context information for display in a first display window of a user interface in response to a first change in context and means for maintaining the context information for display in the first display window until a second change in context occurs.

In an additional feature, a user interface module includes pushing instructions to push context information for display in a first display window of a user interface in response to a first change in context and maintaining instructions to maintain the context information for display in the first display window until a second change in context occurs.

In another feature, a computer program product includes pushing instructions to push context information for display in a first display window of a user interface in response to a first change in context and maintaining instructions to maintain the context information for display in the first display window until a second change in context occurs. The computer program product further includes a computer-readable medium to store the pushing instructions and the maintaining instructions.

In yet another feature, an application program interface includes a command definition. The command definitions includes a pushing command to push context information for display in a first display window of a user interface in response to a first change in context and a maintaining command to maintain the context information for display in the first display window until a second change in context occurs.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
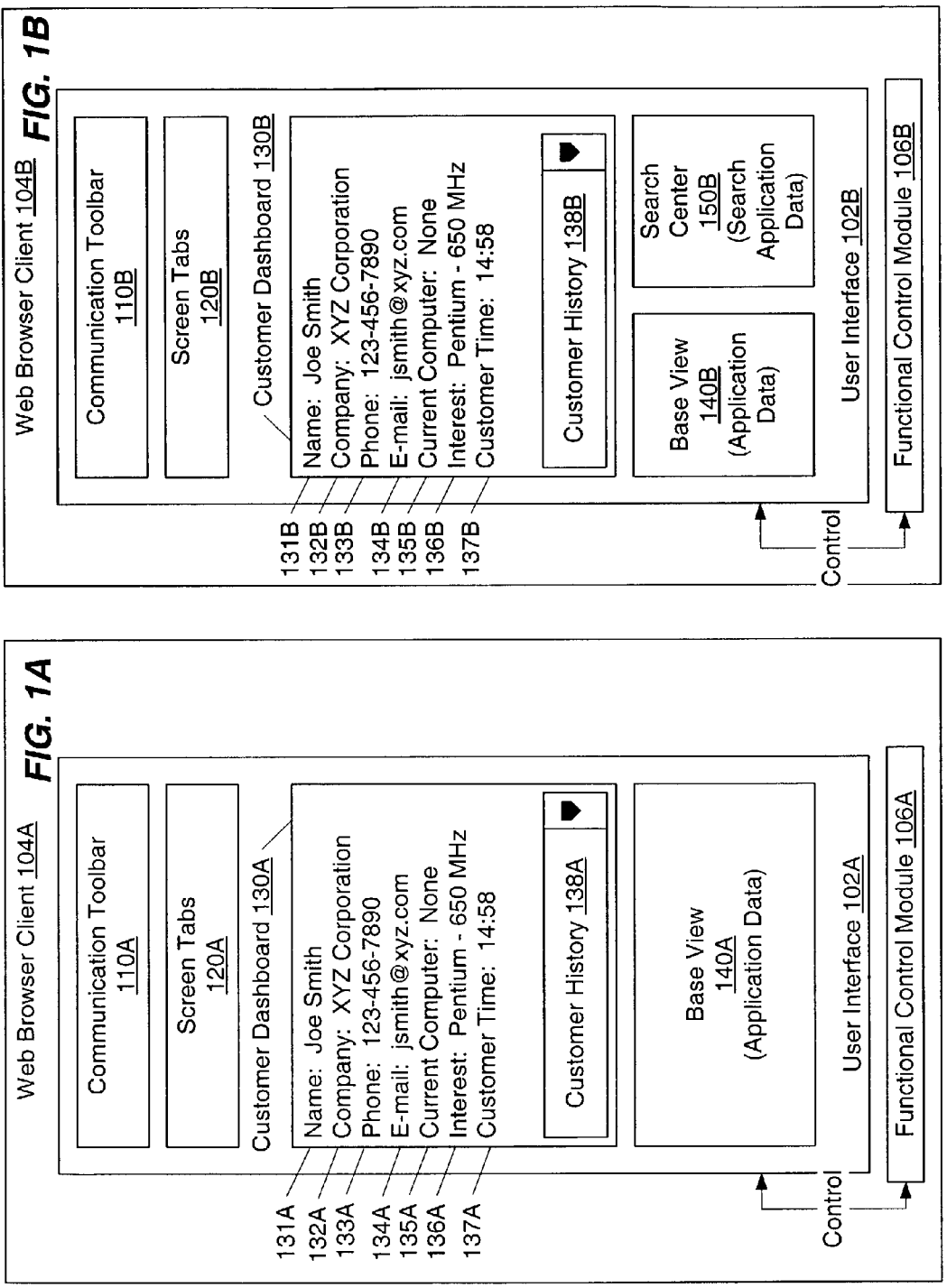
FIGS. 1A and 1B provide examples of a user interface including a persistent dashboard that operates according to the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

A persistent dashboard provides access to key context information in a display window that remains persistent as the user navigates the application and views application data. The persistent dashboard can be populated from a communications event, such as an inbound telephone call; from data entered by the customer service agent via the user interface, such as a response to one of a series of scripted questions; from search results of a user-initiated search; or from application data displayed in a display window of the user interface. For example, for an inbound telephone call, the persistent dashboard can be populated immediately with information regarding the caller, so that the agent has instant information about the caller even before he or she answers the call. Various types of information from enterprise databases can be captured in the persistent dashboard to address the enterprise's business processes and needs.

The persistent dashboard of the present invention can be configured to display information for various types of application data. The present invention is illustrated and described as part of a customer service application, although the invention is more broadly applicable and can be used for any type of host application and user interface.

FIG. 1A shows a user interface 102A presented by a web browser client 104A. In one embodiment, no client software other than a web browser, such as Microsoft Internet Explorer or Netscape Navigator, is needed to run the user interface for the host application. Web browser client 104A also includes functional control module 106A, which controls user interface 102A. An example of a functional control module is a Java applet, which is downloaded when the user accesses the web page for the host application having user interface 102A.

User interface 102A includes a communication toolbar 110A, screen tabs 120A, a persistent dashboard 130A, and a base view 140A. Communication toolbar 110A and screen tables 120A are not essential for the operation of persistent dashboard 130A, but are included for purposes of showing the usefulness of persistent dashboard 130A. Base view 140A represents a display window in which application data are displayed, such that the dashboard data provide context information related to the application data, although base view 140A is not essential for operation of persistent dashboard 130A.

Communication toolbar 110A enables a user to communicate via multiple types of communication channels, such as e-mail, telephone, facsimile, and wireless messaging. Screen tabs 120A enable a user to navigate among various types of application data.

In the example shown, persistent dashboard 130A includes various data fields such as contact name 131A, company 132A, phone 133A, e-mail 134A, current computer 135A, interest 136A, and customer time 137A. Persistent dashboard 130A also includes customer history combo box 138A, which enables the user to view the history of previous communications with the customer whose information is displayed in persistent dashboard 130A. As mentioned above, the data fields included in a persistent dashboard, such as persistent dashboard 130A, are configurable according to the present invention. For example, an account number, customer's local time, or other relevant context information can be selected to be displayed in persistent dashboard 130A. Furthermore, customer dashboard 130A may be configured to include, for example, Previous and Next buttons (not shown) to enable scrolling to and from information related to previous activity of the agent using the host application, such as calls that the agent had previously attended to during a session using the host application.

In the example embodiment shown, persistent dashboard 130A is visible as a separate frame below the communications toolbar 110A and screen tabs 120A and above the frame including base view 140A. In base view 140A, the user can navigate among various types of application data and/or different screens and view of user interface 102A, while persistent dashboard 130A provides a persistent view of context information related to the application data presented in base view 140A. For example, the customer service agent can quickly navigate to information related to the active customer in persistent dashboard 130A by selecting from the combo box 138A of persistent dashboard 130A. The list of views to which the agent can navigate is customizable and, for example, may include the following:
 Contact—Activities (default)
 Contact—Activity Plans
 Contact details
 Contact—Service Requests
 Contact—Agreements
 Contact—Entitlements
 Contact—Campaigns
 Contact—Opportunities.
When a view is selected, one or more records related to the active customer are displayed in base view 140A.

FIG. 1B shows an alternative embodiment of the user interface shown in FIG. 1A, referred to as user interface 102B. User interface 102B includes components corresponding to the components described above with reference FIG. 1A, such as communication toolbar 110B, screen tabs 120B, persistent dashboard 130B, and base view 140B. Persistent dashboard 130B corresponds to persistent dashboard 130A of FIG. 1A, having equivalent data fields 131B through 137B and customer history combo box 138B. User interface 102B also runs within corresponding web browser client 104B and has a corresponding functional control module 106B. Functional control module 106B controls user interface 102B.

In addition to the components shown in FIG. 1A, user interface 102B includes search center 150B, which enables the user to search application data for a particular record of interest. In the example embodiment shown, persistent dashboard 130B is visible as a separate frame below the communications toolbar 110B and screen tabs 120B. Persistent dashboard 130B exists in addition to the frame including search center 150B and the frame including base view 140B.

The following description uses user interface 102B and persistent dashboard 130B as examples of the general capabilities of a user interface including a persistent dashboard according to the present invention.

Populating the Dashboard

The context information displayed in persistent dashboard 130B is changed in response to certain actions, which are referred to herein as changes in context. For example, a change in context can include receiving a communication event, obtaining data entered by a user, focusing on a data record, and selecting a search results record. Actions such as switching to a new screen or view of the user interface, or viewing a different type of application data, are not considered to trigger changes in context unless accompanied by one of the aforementioned context-changing actions.

Once populated, the context information remains in persistent dashboard 130B until another change in context occurs or until a Clear Dashboard command is executed. The context information remains available and is updated for each change in context, even when the display window including persistent dashboard 130B is closed. Dashboard data in persistent dashboard 130B is updated so that, when the user re-opens a display window for persistent dashboard 130B, the context information pertains to the currently active customer and application data.

Additionally, persistent dashboard 130B may be configured to include a button in a display window to update dashboard data displayed with information related to application data also being displayed by user interface 102B.

In one embodiment, user interface 102B is configured to include an Open Dashboard icon (not shown) and a Close Dashboard icon (not shown) that can be clicked to open and close persistent dashboard 130B. In this embodiment, the commands Open Dashboard, Close Dashboard, and Clear Dashboard can also be accessed from an application menu (not shown) using a View command.

Context Change: Receive Communications Event

In one embodiment, when an incoming communication arrives and notification is provided to the agent by communications toolbar 110B, persistent dashboard 130B is automatically updated with key information about the caller, such as the contact name and customer's local time. While this information enables the agent to greet the customer using the proper salutation, the host application retrieves further information about the contact and displays customer-specific information. If the host application finds more than one contact name having the same telephone number, then no contact information is populated in persistent dashboard 130B. In this case, the user can find the appropriate contact information using Search Center 150B.

In one embodiment, during a live telephone call, the user may also populate persistent dashboard 130B with contact information from application data presented in views such as Contact, Service Request, Activity, or Campaign Contact using the keyboard shortcut, "Ctrl+Shift+P". This command updates persistent dashboard 130B with context information, such as contact information, associated with the selected application data record. When releasing a telephone call, context information remains in persistent dashboard 130B until another change in context occurs.

Context Change: Select Search Result Record

In one embodiment, the customer service agent can populate information in persistent dashboard 130B from search center 150B. When the customer cannot be automatically identified from the inbound call, the agent can search for the contact in search center 150B. To populate the dashboard, the user opens persistent dashboard 130B and clicks the "Set Dashboard" button in search center 150B.

Persistent dashboard 130B may be populated from any business object in a results set from search center 150B, as long as the business object has been configured for display in persistent dashboard 130B. Business component configuration is discussed further in detail below. If a user clicks the "Set Dashboard" button for a business object that has not been configured for display in persistent dashboard 130B, dashboard data displayed in persistent dashboard 130B is not updated.

Context Change: Obtain Data Entered by User

A context change can be initiated in response to data entered by the user using a user interface, such as user interface 102B. For example, some host applications provide customer service agents with a scripted series of questions to ask of the customer, and the customer service agent enters a response to each question using the user interface of the host application. Such a series of scripted questions is sometimes referred to as a "SmartScript," and the responses to questions are referred to herein as SmartScript responses, or simply responses. As a customer service agent enters responses, the responses may be updated to persistent dashboard 130B. SmartScript configuration is discussed in further detail below. Other types of data entered may also trigger a context change, and the invention is not limited to changing context for Smart-Script responses.

Context Change: Focus on a Data Record

Once the persistent dashboard is populated with an application data record, such as a contact record, the customer service agent may quickly navigate to information related to the active contact by selecting from the activity combo box 138B of persistent dashboard 130B. In one embodiment, the host application is configured by default to allow the agent to navigate to the following views:

Contact—Activities (default)
Contact—Activity Plans
Contact details
Contact—Service Requests
Contact—Agreements
Contact—Entitlements
Contact—Campaigns
Contact—Opportunities.

The navigation takes the user to the appropriate view with focus on a record related to the active contact. The views accessible from persistent dashboard 130B quick navigation are also configurable, as described below.

Figure 2:
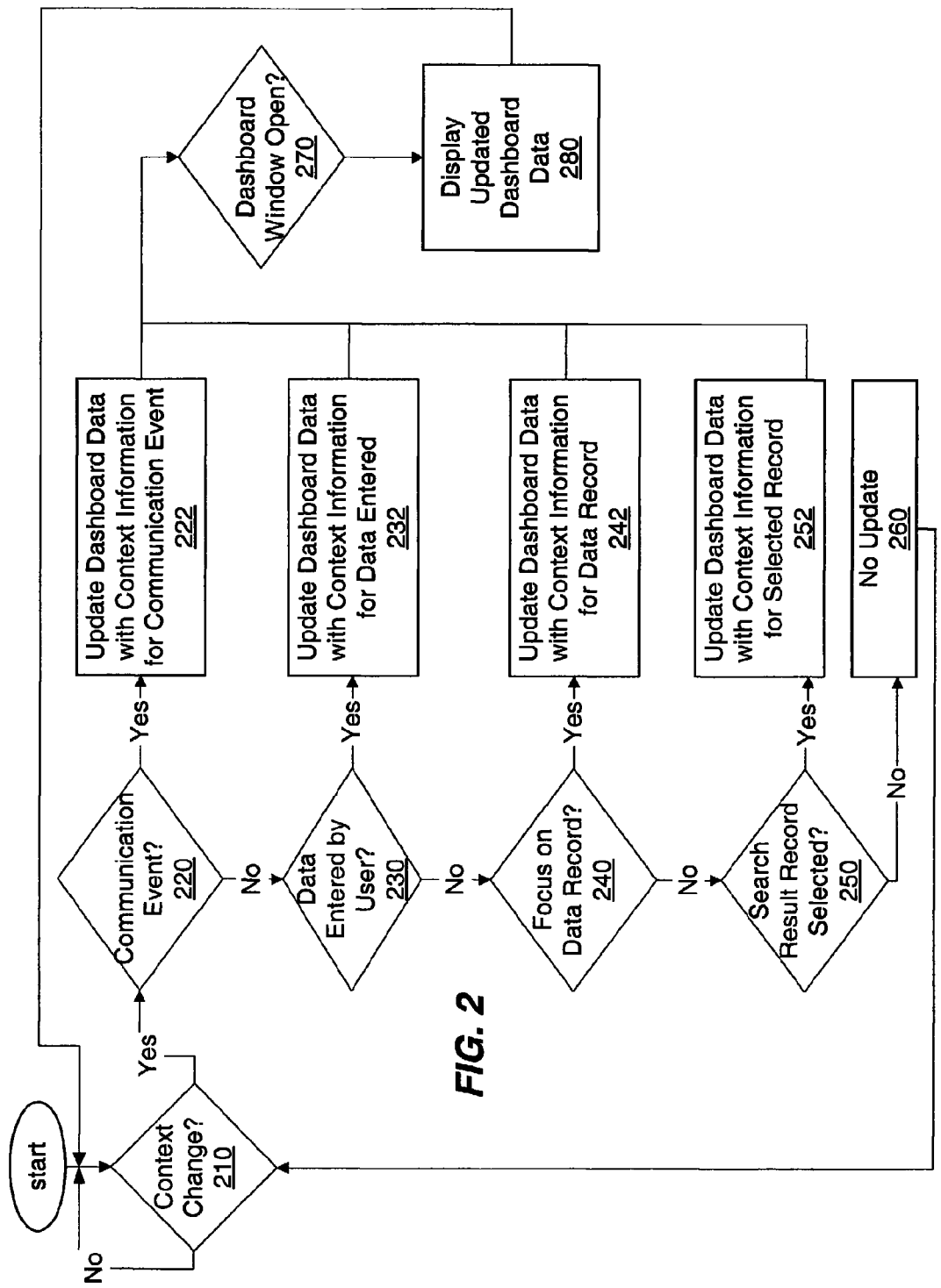
FIG. 2 is a flowchart for updating the persistent dashboard in response to changes in context.

FIG. 2 is a flowchart for updating a persistent dashboard, such as persistent dashboard 130B, in response to changes in context. At Context Change decision point 210, a determination is made whether or not a context change has been made in user interface 102B. If no context change has occurred, no transition is made from Context Change decision point 210. If a context change has occurred, control transitions to Communication Event decision point 220 to test whether a communication event has been received. If a communication event has been received, control transitions to Update Dashboard Data with Context Information for Communication Event step 222. Dashboard data are updated with context information, such as the name of the customer initiating the communication event. For example, if the communication event is an incoming telephone call, the name of the customer is instantaneously displayed in persistent dashboard 130B as the telephone is ringing.

Control then transitions to Dashboard Window Open decision point 270, where a determination whether a display window for persistent dashboard 130B is open is made. If persistent dashboard 130B is open, control transitions to Display Updated Dashboard Data step 280. Context information related to the communication event is displayed in the updated dashboard.

If in Dashboard Window Open decision point 270, persistent dashboard 130B window is not open, updated dashboard data will be available with the updated context information for the communication event when a display window for persistent dashboard 130B is open. Control then transitions back to Context Change decision point 210.

If at Communication Event decision point 220, the context change is not a communication event, control transitions to Data Entered decision point 230. In Data Entered decision point 230, a determination is made whether or not data have been entered. For example, a response may be obtained when the customer service agent uses a scripted list of questions ("SmartScript") that the customer service agent reads to the customer. When a response to one of the questions is obtained and entered by the customer service agent, entry of the response automatically triggers a change in context.

When data are entered by the user, control transitions to Update Dashboard Data with Context Information for Data Entered step 232. Dashboard data related to the response is updated and control transitions to Dashboard Window Open decision point 270.

If at Data Entered decision point 230, no data have been entered, control transitions to Focus on Data Record decision point 240. If at Focus on Data Record decision point 240, the user has focused on a data record, control transitions to Update Dashboard Data with Context Information for Data Record step 242. Dashboard data in persistent dashboard 130B related to the focus data record is updated, and control transitions to Dashboard Window Open decision point 270.

If at Focus on Data Record decision point 240, no data record is in focus, control transitions to Search Results Record Selected decision point 250. A determination is made whether a search result record has been selected by the user, and if so, control transitions to Update Dashboard Data with Context Information for Selected Record step 252. Context information for the selected record, such as a customer name related to the selected record, is updated, and control transitions to Dashboard Window Open decision point 270.

If at Search Result Record Selected decision point 250, no search result record is selected, control transitions to No Update step 260. No update is made to dashboard data, and control transitions to Dashboard Window Open decision point 270.

As noted above, if in Dashboard Window Open decision point 270, a display window for persistent dashboard 130B is not open, updated dashboard data will be available with the updated context information for the communication event when a display window for persistent dashboard 130B is opened. Control then transitions back to Context Change decision point 210.

While four types of context changes are shown in FIG. 2, one of ordinary skill will recognize that other types of context changes may be used to trigger an update of a persistent dashboard, such as persistent dashboard 130B. The present invention enables an administrator to define customized events for his or her enterprise that can also be used to trigger an update of dashboard data. The scope of the invention includes these other types of context changes and is not limited to those shown in FIG. 2.

Figure 3:
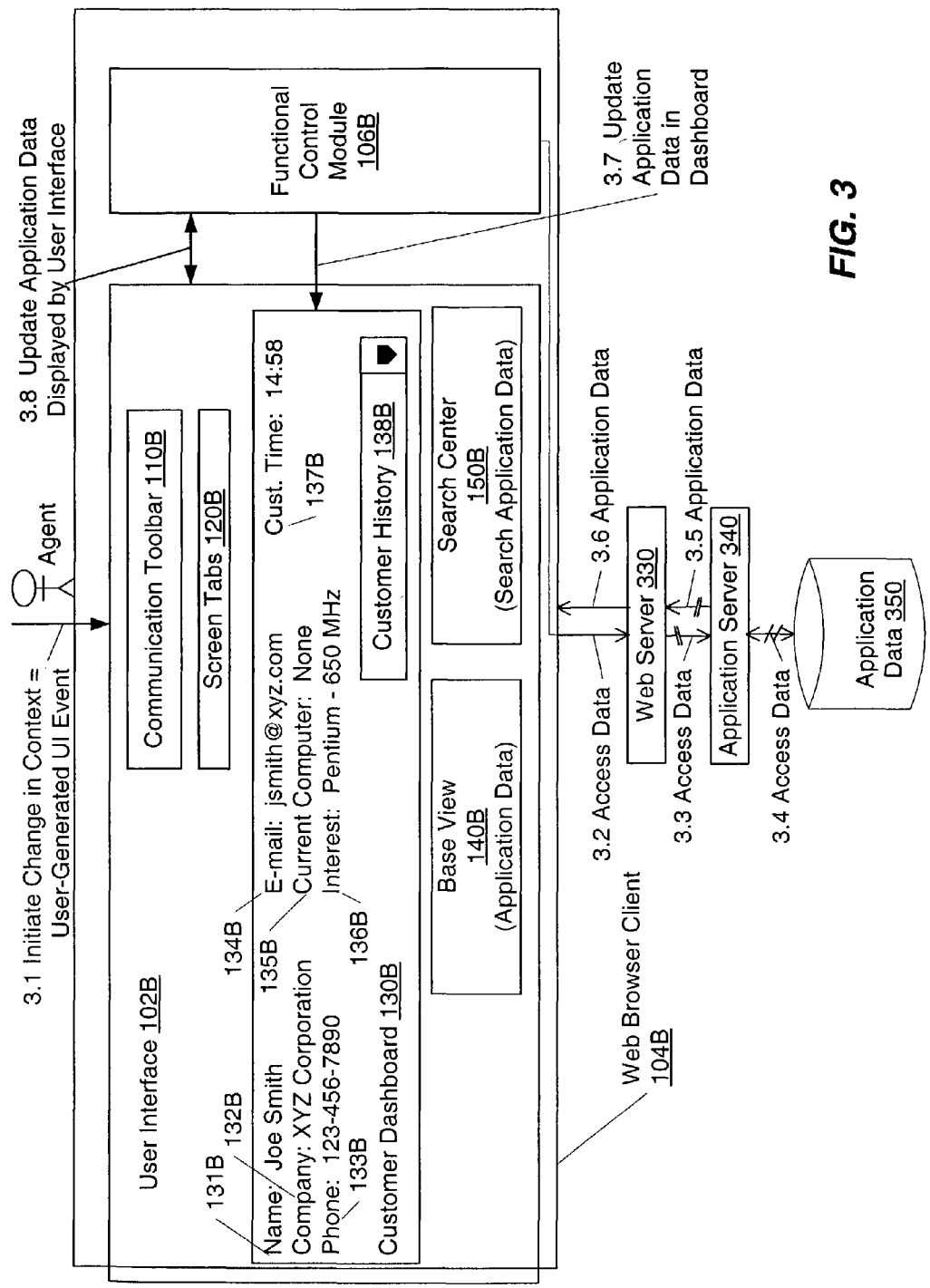
FIG. 3 shows actions taken when updating the persistent dashboard in response to manipulation of application data by a user.

FIG. 3 shows actions taken when updating a persistent dashboard in response to a user-generated user interface event, such as focusing on a data record, selecting a data record from a search result, or entering data. When a user-generated user interface event occurs, a change in context is initiated, which in turn updates persistent dashboard 130B. In action 3.1, the agent initiates a change in context by, for example, selecting a data record from a search result. In action 3.2, functional control module 106B passes a request to access data to web server 330. In action 3.3, web server 330 passes the request to access application data to application server 340. Application server 340 can include a persistent dashboard business service (not shown) to assist with obtaining data to push to persistent dashboard 130B. As noted by the broken arrow connecting web server 330 to application server 340, intermediate software modules may be present between web server 330 and application server 340.

Application server 340 accesses application data 350 in action 3.4. As noted by the broken arrow connecting application server 340 to application data 350, several intermediate modules may be present, such as a database server (not shown). Application server 340 provides application data to web server 330 in action 3.5, and web server 330 provides application data to web browser client 104B in action 3.6. In action 3.7, functional control module 106B updates context information related to the application data shown in persistent dashboard 130B. In action 3.8, functional control module 106B updates application data displayed by basic view 140B of user interface 102B.

Figure 4:
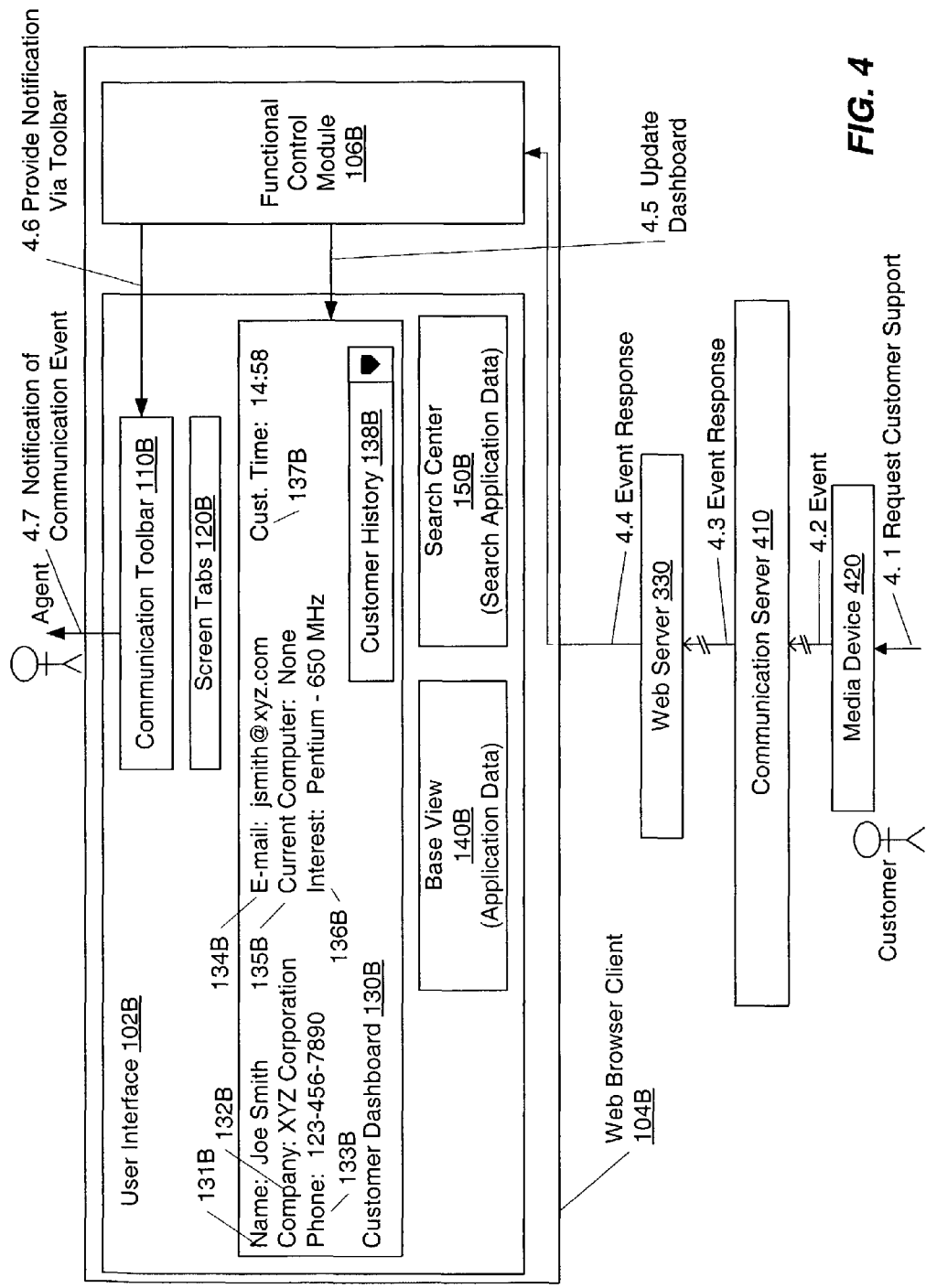
FIG. 4 shows actions taken when updating the persistent dashboard in response to an incoming communication event.

FIG. 4 shows actions taken when updating the persistent dashboard in response to an incoming communication event, such as an incoming telephone call or e-mail. In action 4.1, the customer places a request for customer support using media device 420. The request for customer support is provided via a series of intermediate software modules (not shown) to communication server 410. Communication server 410 receives the event and provides an event response in action 4.3 to web server 330. Again, as indicated by the broken arrow connecting communication server 410 and web server 330, intermediate software modules may exist between communication server 410 and web server 330. Web server 330 provides the event response to web browser client 104B, and functional control module 106B updates persistent dashboard 130B with context information related to the incoming communication event. This context information may include, for example, the name of the customer initiating the telephone call. In action 4.6, functional control module 106B provides notification of the incoming communication event to communication toolbar 110B. Communication toolbar 110B then provides notification of the communication event to the customer service agent, for example, by causing a button on communication toolbar 110B to blink.

Figure 5:
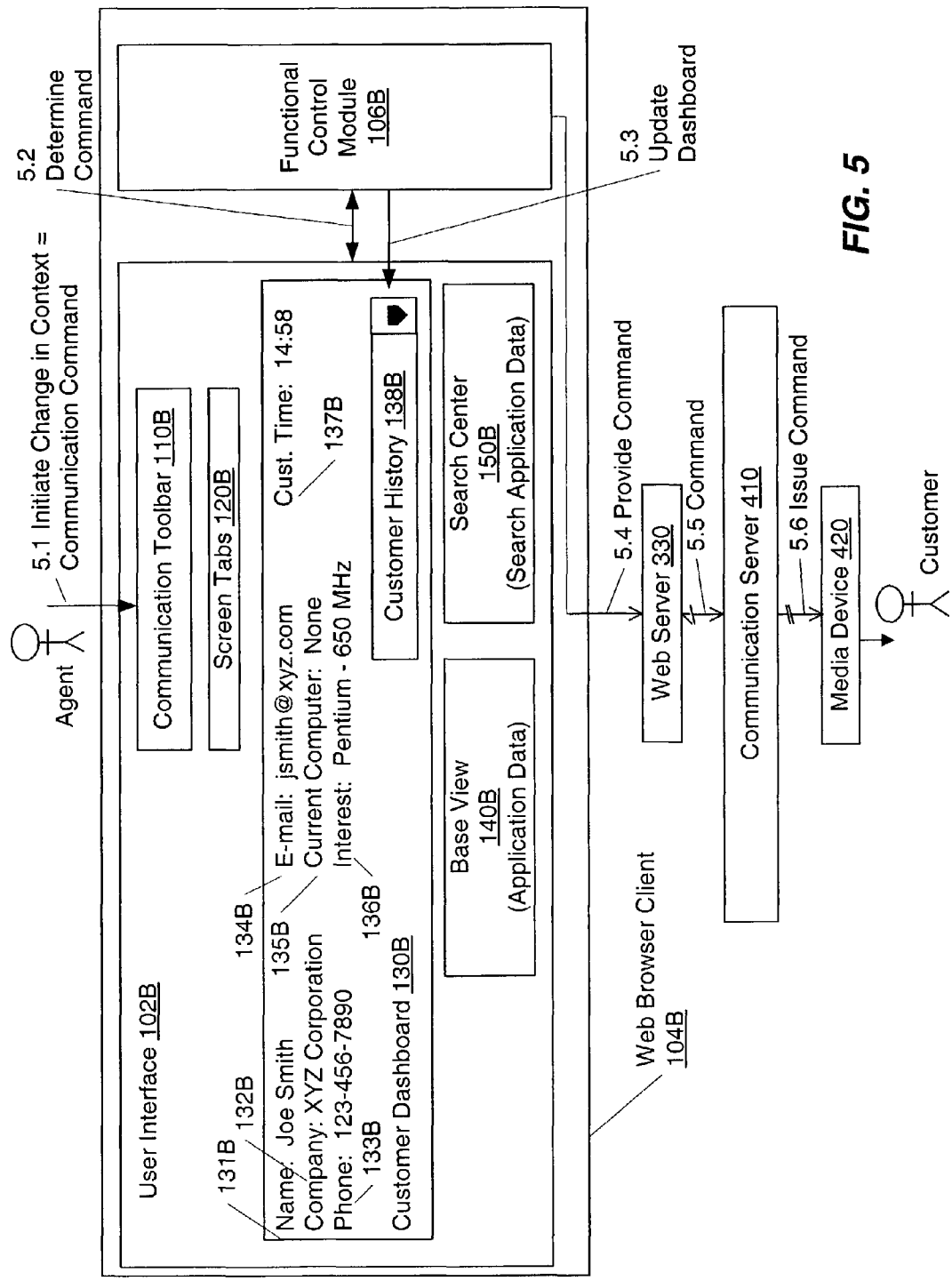
FIG. 5 shows actions taken when updating the persistent dashboard in response to an outgoing communication command.

FIG. 5 shows updates to user interface 102B when a customer service agent issues a communication command, for example, by clicking on a button of communication toolbar 110B to initiate a telephone call. Issuing a communication command is similar to the user-generated user interface events described with reference to FIG. 3, although other software modules, such as communication server 410 of FIG. 4, are involved. In action 5.1, the customer service agent clicks a Make Call button on communication toolbar 110B to initiate a telephone call. The resulting communication command produces a change in context that is used to update persistent dashboard 130B. Updating persistent dashboard 130B may involve additional modules not shown, such as application server 340 of FIG. 3, to access application data related to the communication command. In action 5.2, functional control module 106B determines the communication command to be issued. In action 5.3, functional control module 106B updates persistent dashboard 130B with context information related to the communication command. In action 5.4, functional control module 106B provides the command to be issued to web server 330. Web server 330 provides the command to communication server 410. Communication server 410 then issues the command in action 5.6, via several intermediate software modules (not shown), to media device 420.

Example Architecture

Figure 6:
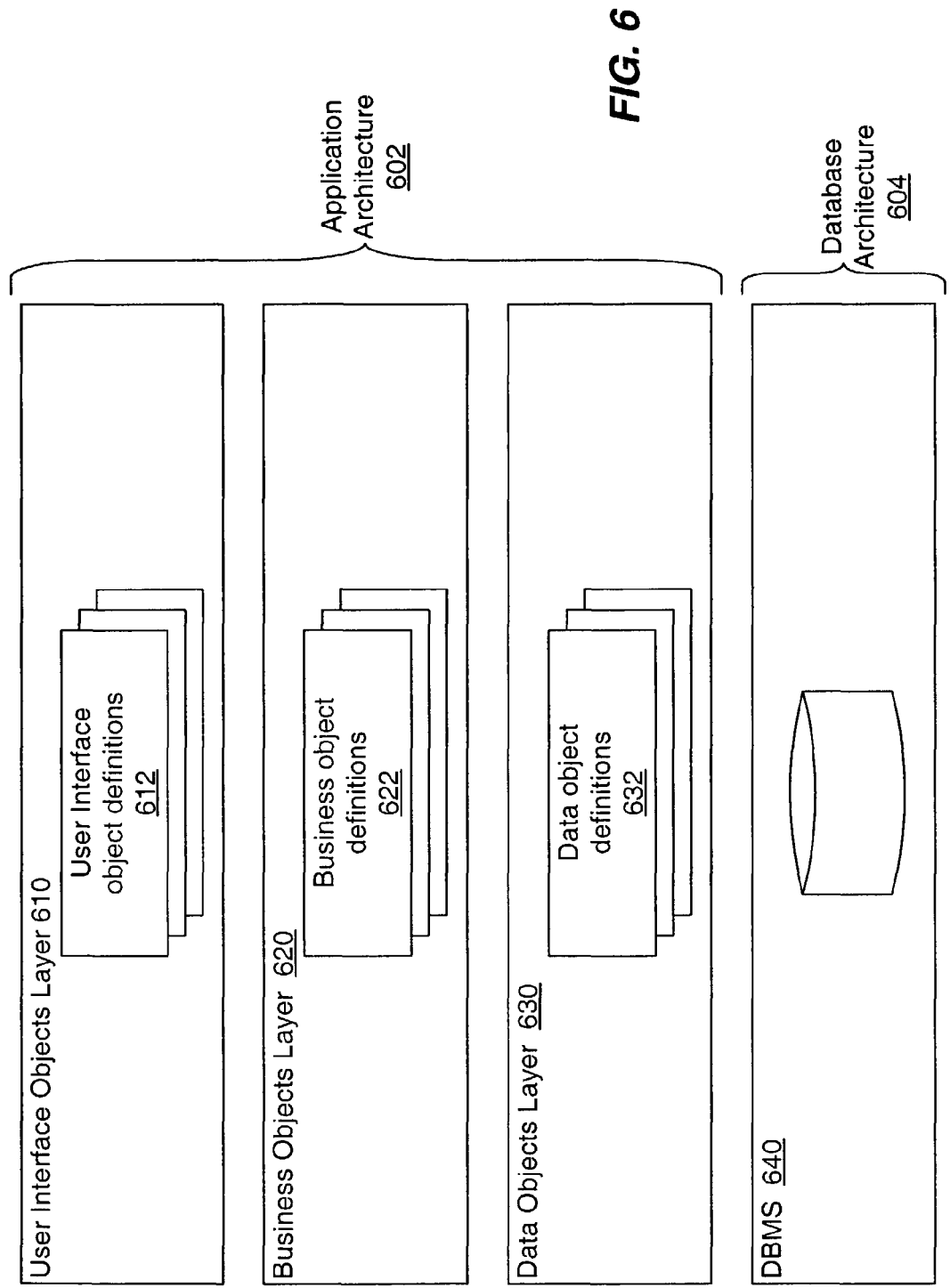
FIG. 6 is a diagram of a layered architecture in which an embodiment of the persistent dashboard can be implemented.

FIG. 6 is a diagram of a layered architecture in which an embodiment of the persistent dashboard can be implemented. Application architecture 602 includes user interface objects layer 610, business objects layer 620, and data objects layer 630. User interface objects layer 610 includes one or more user interface object definitions 612. An example of a user interface object definition is a view definition for base view 140B. Business objects layer 620 includes one or more business object definitions 622. An example of a business object definition is a contact business object definition. Data objects layer 630 includes one or more data object definitions 632. An example of a data object definition is a schema for a database table. Underlying database architecture 604, which is used to store application data, includes a database management system (DBMS) 640.

Figure 7:
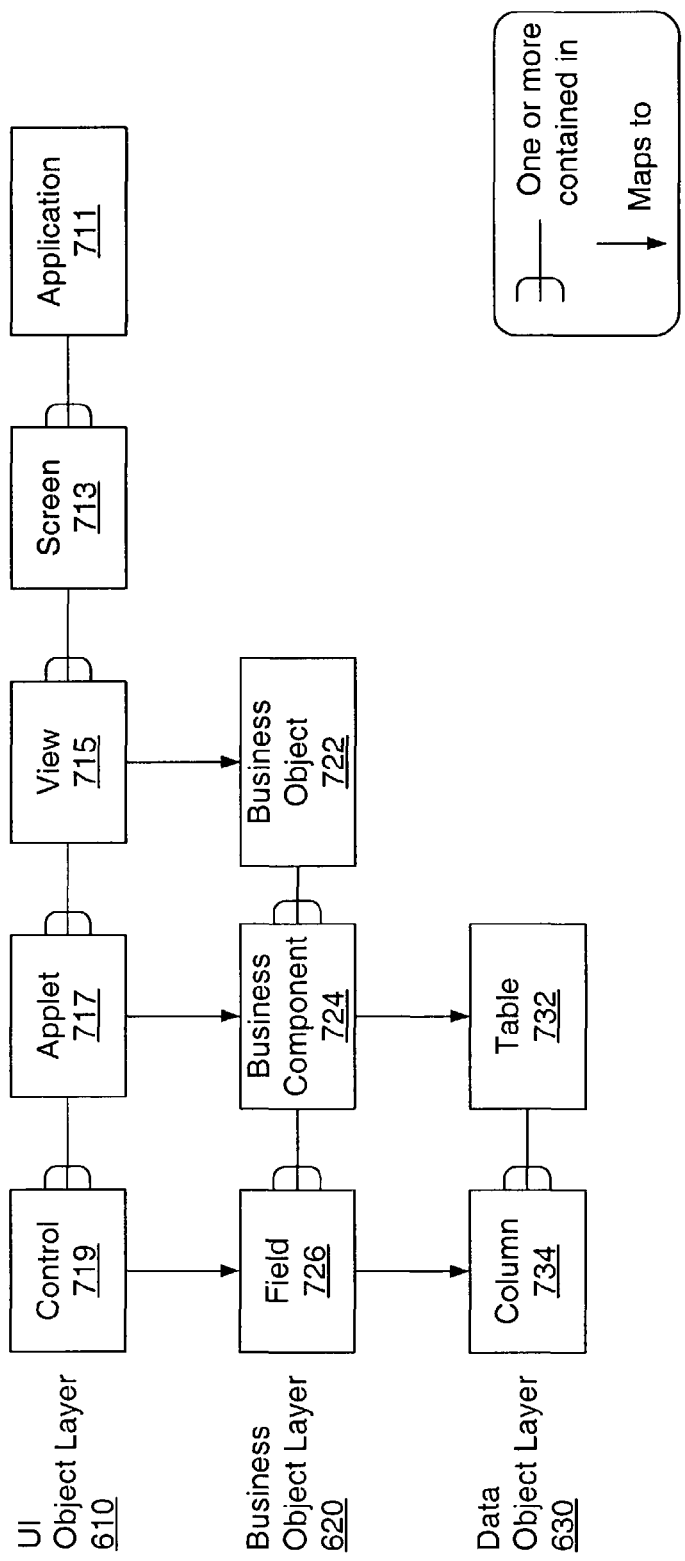
FIG. 7 is a diagram of object layers and object definitions according to the layered architecture of FIG. 6.

FIG. 7 is a diagram of object layers and object definitions according to the layered architecture of FIG. 6. User interface objects layer 610 includes object definitions application 711, screen 713, view 715, applet 717, and control 719. As used herein, an application object definition defines a collection of screens and does not define an application program. Application object definition 711 includes one or more screen 713. Each screen 713 may contain one or more view 715. A view presents one or more applets together at one time in a predefined visual arrangement and logical data relationship. Each view 715 may contain one or more applet 717. In the architecture of the present invention, the term applet is used to describe a form including one or more fields and controls, and is distinguishable from the term applet when used to describe, for example, a Java program referred to as a Java applet. Each applet 717 may include one or more control 719.

Business objects layer 620 includes business object definition 722, business component definition 724, and field object definition 726. Each business object definition 722 can include one or more business component object definition 724. Each business component object definition 724 may include one or more field object definition 726.

Data object layer 630 includes table object definition 732 and column object definition 734. Each table object definition 732 can include one or more column object definition 734.

As shown in FIG. 7, view object definition 715 of user interface object layer 610 maps to business object definition 722 of business objects layer 620. A mapping indicates a one-to-one relationship between objects defined according to the object definitions. For example, a contact view of user interface 102B displays data for a contact business object.

As noted above, a view may include one or more applets, and a business object may include one or more business components. Accordingly, applets object definition 717 of user interface object layer 610 maps to business component object definition 724 of business objects layer 620. A particular applet, or form, of user interface 102B includes data for a particular business component. Furthermore, a business component, such as business component 724, maps to an object definition, such as table object definition 732, of data objects layer 630. Consequently, a particular applet displays data for a particular business component from a particular data table. In at least one embodiment, a "virtual" business component corresponds to a business component for which data are not obtained from a single database table, but instead are the result of a combination of joins with two or more database tables.

Control object definition 719 of user interface object layer 610 maps to field object definition 726 of business objects layer 620. A particular control within an applet corresponds to a field object definition. Furthermore, field object definition 726 maps to column object definition 734 of data object layer 630. Data for a column of a particular table corresponds to a field of the corresponding business component and is displayed within a control in a corresponding applet.

A persistent dashboard, such as persistent dashboard 130B, can be implemented as a separate frame and view below communication toolbar 110B and above base view 140B. Persistent dashboard 130B is based on a virtual business component called "Persistent dashboard" which lies in the instance of a "Persistent dashboard" business object. Examples of object definitions related to a persistent dashboard, such as persistent dashboard 130B, are given below:

Persistent Dashboard Business Object
Persistent Dashboard Business Component (virtual business component)
Persistent Dashboard Business Service (controls the functionality—also referred to as "persistent engine")
Persistent Dashboard Applet (user interface)
Persistent Dashboard View (user interface)

When updating persistent dashboard 130B from communication toolbar 110B, a SmartScript response, or search center 150B, an application program can use an UpdateDashboard application program interface (API) for the Persistent Dashboard Business Service. The UpdateDashboard API can be called using the InvokeMethod function of the Persistent Dashboard Business Service and passing a set of name/value pairs, such as the following:

Source Name: 'Base View'
BusComp Name: 'Contact'
RowId: 'srowid'

In one embodiment, the InvokeMethod function of the Persistent Dashboard Business Service is used to call UpdateDashboard API for configurable events. For example, an enterprise may define a customized event for which the dashboard is updated and associate the customized event with a button on an applet within the user interface.

Upon receiving the arguments, the invoked function of the Persistent Dashboard Business Service obtains the set of fields configured to be displayed, retrieves corresponding data from application databases, and populates persistent dashboard 130B. The UpdateDashboard API and Persistent Dashboard Business Service are discussed in further detail below.

Dashboard Configuration

In one embodiment, persistent dashboard 130B is configurable. For example, various user interface changes can be made, such as changing the color, size, location, and adding or removing fields from the display window (applet) displaying persistent dashboard 130B.

In one embodiment, a list of views can be configured to which an agent can quickly navigate using activity combo box 138B of persistent dashboard 130B. In one embodiment, the administrator can specify the list of views at design time using user properties of the Persistent Dashboard Business Service. A user property is an attribute of an object, such as a user interface control, that can be used to define specialized properties that define the object's run-time behavior. These user properties enable the text box to behave differently than other objects that are instances of the object's class. For example, for a text box user interface object, a user property with value '[0-9]' can be defined so that the text box accepts only numeric input, such as a zip code. Such a user property enables the text box to reject alphabetic characters at run-time as invalid values, in contrast to the behavior for most text boxes.

The list of views is specified with user properties named "View 1", "View 2" and so on. A standard set of views is displayed. In one embodiment, user properties "View 1" through "View 8" are created and shipped with the host application.

In one embodiment, the Persistent Dashboard Business Component obtains the list of user properties that have names with a "View" prefix at run-time, finds the display name for the views, and adds the view names to the activity combo box 138B list of values. If the name of a particular view is specified incorrectly, that view is not listed. In one embodiment, there is no limit to the number of views that the administrator can specify.

In one embodiment, another configurable feature is the list of business component fields that appear on persistent dashboard 130B. In one embodiment, a set of labels and edit boxes are pre-configured on persistent dashboard 130B for a set of default fields. The administrator can set a list of user properties, one for each business component, each having names beginning with "List," such as "List 1", "List 2", and so on. The name of a particular business component is specified first, and the fields from that business component are specified one after the other, separated by the field separator ";".

For example, if the Last Name and First Name fields from a Contact business component and the type field from an Activity business component are to be displayed on persistent dashboard 130B, the administrator creates user properties with the following attributes:

Name: List 1 Value: "Contact;Last Name;First Name"
Name: List 2 Value: "Activity;Type"

In one embodiment, several different types of fields can be placed on persistent dashboard 130B, such as business component fields, data entry fields, and communication toolbar 110B data-driven fields.

As mentioned earlier, some edit boxes can be pre-created on persistent dashboard 130B for display purposes. These edit boxes can have names such as "Field 1", "Field 2" and so on. If Field 1 is always used to display the Contact Last Name, a new user property can be created as follows:

Name: Field 1 Value: "List 1.1"

where the string "List 1.1" refers to the first field name of the user property with name "List 1".

To display in Field 2 the activity type and the Service Request Abstract, a new user property can be created as follows:

Name: Field 2 Value: "List 2.1;List 3.1"

The list of fields, such as SmartScript response fields, that are passed as name/value pairs can be specified as a user property with a name such as "SmartScript List".

To create a list of communication toolbar 110B data-driven fields, the administrator can create a user property with a name such as "Communication List." For example, to display the number of calls in queue (which is a communication toolbar 110B data-driven field), the Last and First Names from the Contact business component, the type of the activity, and an abstract of the service request, the administrator can create four user properties as follows:

| | |
|---|---|
| Name: Communication List | Value: "Calls in queue" |
| Name: List 1 | Value: "Contact; Last Name; First Name" |
| Name: List 2 | Value: "Activity; Type" |
| Name: List 3 | Value: "Service Request; Abstract" |

The above examples show how an administrator can configure each field on persistent dashboard 130B.

When context information is pushed to persistent dashboard 130B (from communication toolbar 110B or search center 150B), persistent dashboard 130B code goes through the list of user properties starting with, for example, "Field," searches for the fields mapped to the relevant business component, such as the Contact business component, and updates these fields on persistent dashboard 130B.

Fields that are not mapped in user properties are not updated in persistent dashboard 130B. If the business component name or field name specified by the administrator in user properties is not valid, the field will not be mapped. In contrast to the user properties for the list of quick navigation views, which has no limit, the maximum number of fields is limited by the number of fields available on persistent dashboard Each field and the corresponding field label of persistent dashboard 130B can be configured by an administrator. To save space, the same label can be used for fields from different tables; for example, the label "Name" can be used for both an Account Name and a Contact Name. Alternatively, each field can be configured with its own label to correspond to the data being displayed.

Persistent Engine

A persistent engine within the host application server is responsible for ensuring that persistent dashboard, such as persistent dashboard 130B, is continually updated whenever a change in context occurs. In one embodiment, the persistent engine is implemented as a persistent dashboard business service. The persistent dashboard business service provides an application program interface (API) that includes a member function to update persistent dashboard 130B from communication toolbar 110B. In one embodiment, the member function is called UpdatefromCTI, which updates persistent dashboard 130B whenever a communication event occurs. Member functions can correspond to a command definition for a command to, for example, push context information for display in a first display window of a user interface in response to a first change in context. The Update Dashboard API may further include a command definition for a maintain command to maintain the context information for display in the first display window until a second change in context occurs.

The communication administration views can be pre-configured to call InvokeMethod (with UpdateDashboard as a parameter) when a communication event is received. Variables such as Phone number, Number of calls in queue, and other communication-related variables are passed as arguments to update persistent dashboard 130B. When InvokeMethod is called with the UpdateDashboard parameter, the business service member function UpdatefromCTI obtains the list of fields that are configured to be displayed in persistent dashboard 130B. Data to update persistent dashboard 130B can be passed as parameters and/or queried from appropriate application databases using key information, such as Contact ID, for the telephone number associated with the incoming telephone call.

Other modules, such as a SmartScript or Search Center 150B, notify persistent dashboard 130B when relevant information needs to be updated. These modules use the same API described above, UpdateDashboard. The UpdateDashboard API is called from different modules (through the InvokeMethod function of the Persistent Dashboard Business Service), and the arguments passed are a set of name/value pairs representing persistent dashboard 130B fields. Upon receiving the arguments, the member function(s) of the Persistent Dashboard Business Service obtain the set of fields configured to be displayed and populate persistent dashboard 130B directly or after retrieving the data from an application database.

For example, in one embodiment, the UpdateDashboard API can be called from Search Center 150B when a member of the Search Center search result set is a contact record and a "Set Dashboard" control is selected. If a customer service agent is talking to a customer and persistent dashboard 130B is populated with the customer's information, when the "Set Dashboard" button is clicked, data in persistent dashboard 130B will be replaced with new information from the search results. The information about the customer who is currently talking with the customer service agent is overwritten. In some embodiments, past versions of dashboard data can be retrieved.

The UpdateDashboard API can be called by a SmartScript module whenever relevant information is provided (where relevance is determined by the SmartScript module itself). In one embodiment, persistent dashboard 130B does not determine which fields are updated with data entered by the user, such as a SmartScript response, and the determination of relevance for a SmartScript response (as well as for other types of data entered) is configurable.

By providing this interface API that can be called from various modules in the host application or from other applications, persistent dashboard 130B does not need other data about the architecture of other modules.

Since the persistent dashboard is implemented as a business service, a program calling persistent dashboard 130B may use a GetService ("Persistent dashboard") command. The program may set up a control to either push information to persistent dashboard 130B or pull information from persistent dashboard 130B. Details for example commands provided by the Persistent Dashboard Business Service are displayed in Table 1 below.

TABLE 1

| Command | Description |
| --- | --- |
| GetCurrentRecordId | This command returns the record ID for the current record populated in the dashboard. For example, if the record is from the Contact business component, a Contact Id is returned. If the record is from the Account business component, an Account Id is returned. |
| GetDashboardFieldValue | This command returns the current field value for the record populated in the dashboard. The input argument is the name/value pair for the dashboard field. The output argument is a field value. |
| Update Dashboard | This command is used to populate the dashboard with a new record. For example, the following parameters can be used for a field to update the dashboard from a Contact Name displayed in base view 140B: Source Name: Base View Buscomp Name: Contact RowId: E301 |

System Suitable for Implementing the Present Invention

Figure 8:
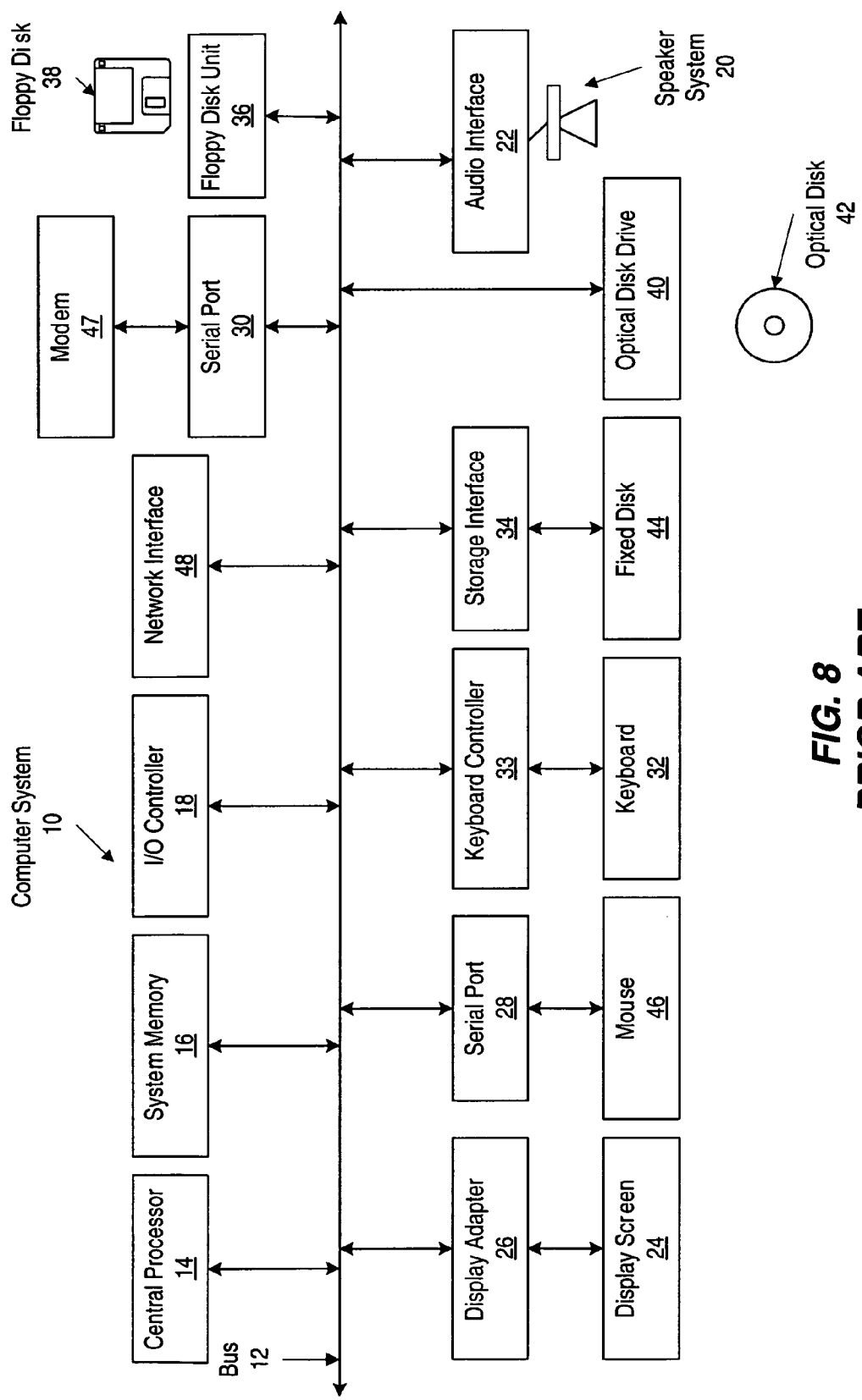
FIG. 8 is a block diagram illustrating a computer system suitable for implementing embodiments of the present invention.

FIG. 8 depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliances, X-window terminals or other such computing devices. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
pushing context information, in response to a first change in context; and
maintaining the context information, until a second change in context occurs, wherein
the context information is configured to be displayed in a first display window of a user interface of a client,
the client is configured to be communicatively coupled to a server,
the maintaining comprises
updating the context information, in response to a change in the context information, and
the server is configured to
perform the pushing to a functional control module, wherein
the functional control module is configured to be executed on the client,
the functional control module is configured to perform the updating, and
the functional control module is configured to provide a notification of an incoming communication event associated with the second change in context, and
perform the maintaining without respect to whether the first display window is currently displayed.

2. The method of claim 1 wherein
the pushing is performed substantially contemporaneously with the first change in context.

3. The method of claim 2 wherein
the context information is configurable.

4. The method of claim 3 wherein
the first change in context comprises obtaining a smart script response.

5. The method of claim 3 wherein
the first change in context comprises receiving a selection of a data record from a search result.

6. The method of claim 3 wherein
the first change in context comprises receiving an update command.

7. The method of claim 3 wherein
the first change in context comprises sending a communication command.

8. The method of claim 2 further comprising:
persistently displaying the context information in the first display window until the second change in context occurs.

9. The method of claim 2 wherein
the first change in context comprises receiving a communication event.

10. The method of claim 2 further comprising:
responsive to the second change in context, causing the functional control module to update the first display window.

11. The method of claim 2 wherein
a change in a view presented as part of the user interface corresponds to a change in context other than the first change in context and
the second change in context.

12. The method of claim 1 wherein
the maintaining is performed persistently until the second change in context; and
the server is configured to
determine whether the first change in context has occurred,
responsive to determining that the first change in context has occurred, determine whether a communication event has occurred,
responsive to determining that the communication event has occurred,
perform a first update operation on an item of data, wherein
the item of data comprises data for the user interface, and
the first update operation uses one or more items of context information for the communication event,
determine whether a user has provided one or more items of user-entered data,
responsive to determining that the user has provided the one or more items of user-entered data, perform a second update operation on the item of data, wherein
the second update operation uses one or more items of context information, and
the one or more items of context information correspond to the one or more items of user-entered data,
determine whether the user has focused on a data record,
responsive to determining that the user has focused on a data record, perform a third update operation on the item of data, wherein
the third update operation uses context information for the data record,
determine whether a search result record is selected,
responsive to determining that the search result record is selected,
perform a fourth update operation on the item of data, wherein
the fourth update operation uses context information for the search result record,
determine whether the user interface is currently displayed, and
responsive to determining that the user interface is currently displayed, display on the user interface the item of data, wherein
the displaying comprises displaying the item of data after the updating is complete.

13. The method of claim 12 wherein
an event triggering the first change in context is configurable.

14. The method of claim 13 wherein
an event triggering the second change in context is configurable.

15. The method of claim 12 further comprising:
displaying application data in a second display window of the user interface, wherein
the context information is related to the application data.

16. The method of claim 3 further comprising:
displaying application data in a second display window, wherein
the first and the second changes in context are related to the application data.

17. A computer program product comprising:
pushing instructions to push context information, in response to a first change in context, wherein
the context information is configured to be displayed in a first display window of a user interface of a client;
maintaining instructions to maintain the context information, until a second change in context occurs; and
a computer-readable medium to store the pushing instructions and the maintaining instructions, wherein
the client is communicatively coupled to a server,
the maintaining instructions comprise instructions for updating the context information, in response to a change in the context information, instructions for making a determination with respect to whether an inbound call is able to be automatically associated with a contact record, wherein if said determination indicates that said inbound-call is unable to be automatically associated with any contact record, a search is enabled, said search is entered through the user interface, a search result is produced by said search, said search result is a result contact record, said search result is displayed in response to an actuation of a user control, said second change in context is a selection of said search result, the updating is configurably limited to a set of fields associated with said first display window, and a past version of the context information is configured to be available for a subsequent retrieval, the pushing instructions and the maintaining instructions are configured to be executed on the server, and the pushing instructions and the maintaining instructions are configured to cause the server to perform the pushing to a functional control module, wherein the functional control module is configured to be executed on the client, and the functional control module is configured to provide a notification of an incoming communication event associated with the second change in context, and perform the maintaining without respect to whether the first display window is currently displayed.

18. The computer program product of claim 17 wherein the pushing instructions are configured to cause the pushing to be performed substantially contemporaneously with the first change in context, the server is configured to determine whether the first change in context has occurred, responsive to determining that the first change in context has occurred, determine whether a communication event has occurred, responsive to determining that the communication event has occurred, perform a first update operation on an item of data, wherein the item of data comprises data for the user interface, and the first update operation uses one or more items of context information for the communication event, determine whether a user has provided one or more items of user-entered data, responsive to determining that the user has provided the one or more items of user-entered data, perform a second update operation on the item of data, wherein the second update operation uses one or more items of context information, and the one or more items of context information correspond to the one or more items of user-entered data, determine whether the user has focused on a data record, responsive to determining that the user has focused on a data record, perform a third update operation on the item of data, wherein the third update operation uses context information for the data record, determine whether a search result record is selected, responsive to determining that the search result record is selected, perform a fourth update operation on the item of data, wherein the fourth update operation uses context information for the search result record, determine whether the user interface is currently displayed, responsive to determining that the user interface is currently displayed, display on the user interface the item of data, wherein the displaying comprises displaying the item of data after the updating is complete, responsive to the second change in context, cause the functional control module to update the first display window, and if said second change in context is a selection of a search result, store a past version of the context information for retrieval, and the maintaining instructions are configured to cause the context information to be maintained persistently until the second change in context.

19. A system comprising:

a computer readable storage medium;

means for pushing context information for display in a first display window of a user interface of a client, in response to a first change in context; and means for maintaining the context information for display in the first display window, until a second change in context occurs, wherein the client is communicatively coupled to a server, the pushing means and the maintaining means are configured to be executed on the server, the means for maintaining comprises means for updating the context information, in response to a change in the context information, the means for updating comprises means for making a determination with respect to whether an inbound call is able to be automatically associated with a contact record, wherein if said determination indicates that said inbound call is unable to be automatically associated with any contact record, a search is enabled, said search is entered through the user interface, a search result is produced by said search, said search result is a result contact record, said search result is displayed in response to an actuation of a user control, said second change in context is a selection of said search result, the means for updating is configurably limited to a set of fields associated with said first display window, and a past version of the context information is configured to be available for a subsequent retrieval, and the pushing means and the maintaining means are configured to cause the server to perform the pushing to a functional control module, wherein the functional control module is configured to be executed on the client, and the functional control module is configured to provide a notification of an incoming communication event associated with the second change in context, and perform the maintaining without respect to whether the first display window is currently displayed.

20. The system of claim 19 wherein
the means for pushing are configured to perform the pushing substantially contemporaneously with the first change in context,
the server is configured to
- determine whether the first change in context has occurred,
- responsive to determining that the first change in context has occurred, determine whether a communication event has occurred,
- responsive to determining that the communication event has occurred, perform a first update operation on an item of data, wherein
  - the item of data comprises data for the user interface, and
  - the first update operation uses one or more items of context information for the communication event,
- determine whether a user has provided one or more items of user-entered data,
- responsive to determining that the user has provided the one or more items of user- entered data, perform a second update operation on the item of data, wherein
  - the second update operation uses one or more items of context information, and
  - the one or more items of context information correspond to the one or more items of user-entered data,
- determine whether the user has focused on a data record,
- responsive to determining that the user has focused on a data record, perform a third update operation on the item of data, wherein
  - the third update operation uses context information for the data record,
- determine whether a search result record is selected,
- responsive to determining that the search result record is selected, perform a fourth update operation on the item of data, wherein
  - the fourth update operation uses context information for the search result record,
- determine whether the user interface is currently displayed,
- responsive to determining that the user interface is currently displayed, display on the user interface the item of data, wherein
  - the displaying comprises displaying the item of data after the updating is complete,
- responsive to the second change in context, cause the functional control module to update the first display window, and
- if said second change in context is a selection of a search result, store a past version of the context information for retrieval, and the means for maintaining are configured to maintain the context information persistently until the second change in context.

21. A computer-readable medium comprising:
an application program interface comprising
  a command definition for
  - a pushing command to push context information, in response to a first change in context, wherein
    - the context information is configured to be displayed in a first display window of a user interface of a client, and
  - a maintaining command to maintain the context information for display, until a second change in context occurs, wherein
    - the client is communicatively coupled to a server,
    - the maintaining command is configured to cause updating of the context information, in response to a change in the context information,
    - the pushing command and the maintaining command are configured to be executed on the server, and
    - the pushing command and the maintaining command are configured to cause the server to perform the pushing to a functional control module, wherein
      - the functional control module is configured to be executed on the client,
      - the functional control module is configured to perform the updating, and
      - the functional control module is configured to provide a notification of an incoming communication event associated with the second change in context, and
    - perform the maintaining without respect to whether the first display window is currently displayed; and
  instructions to implement the command definition.

22. The computer-readable medium of claim 21 wherein
the pushing command is executed substantially contemporaneously with the first change in context, and
the server is configured to
- determine whether the first change in context has occurred,
- responsive to determining that the first change in context has occurred, determine whether a communication event has occurred,
- responsive to determining that the communication event has occurred, perform a first update operation on an item of data, wherein
  - the item of data comprises data for the user interface, and
  - the first update operation uses one or more items of context information for the communication event,
- determine whether a user has provided one or more items of user-entered data,
- responsive to determining that the user has provided the one or more items of user-entered data, perform a second update operation on the item of data, wherein
  - the second update operation uses one or more items of context information, and
  - the one or more items of context information correspond to the one or more items of user-entered data,
- determine whether the user has focused on a data record,
- responsive to determining that the user has focused on a data record, perform a third update operation on the item of data, wherein
  - the third update operation uses context information for the data record,
- determine whether a search result record is selected,
- responsive to determining that the search result record is selected, perform a fourth update operation on the item of data, wherein
  - the fourth update operation uses context information for the search result record,
- determine whether the user interface is currently displayed,
- responsive to determining that the user interface is currently displayed, display on the user interface the item of data for the user interface,
- responsive to the second change in context, cause the functional control module to update the first display window, and if said second change in context is a selection of a search result, store a past version of the context information for retrieval, and the maintaining command is configured to persistently maintain the context information until the second change in context.

23. A user interface module embodied in a computer-readable medium, wherein the user interface module comprises:

pushing instructions to push context information, in response to a first change in context, wherein the context information is configured to be displayed in a first display window of a user interface of a client; and maintaining instructions to maintain the context information, until a second change in context occurs, wherein the maintaining instructions are configured to cause updating of the context information, in response to a change in the context information, the client is communicatively coupled to a server, the pushing instructions and the maintaining instructions are configured to be executed on the server, and the pushing instructions and the maintaining instructions are configured to perform the pushing to a functional control module, wherein the functional control module is configured to be executed on the client, the functional control module is configured to perform the updating, and the functional control module is configured to provide a notification of an incoming communication event associated with the second change in context, and perform the maintaining without respect to whether the first display window is currently displayed.

24. The user interface module embodied in the computer-readable medium of claim 23 wherein the pushing instructions are executed substantially contemporaneously with the first change in context, the server is configured to determine whether the first change in context has occurred, responsive to determining that the first change in context has occurred, determine whether a communication event has occurred, responsive to determining that the communication event has occurred, perform a first update operation on an item of data, wherein the item of data comprises data for the user interface, and the first update operation uses one or more items of context information for the communication event, determine whether a user has provided one or more items of user-entered data, responsive to determining that the user has provided the one or more items of user-entered data, perform a second update operation on the item of data, wherein the second update operation uses one or more items of context information, and the one or more items of context information correspond to the one or more items of user-entered data, determine whether the user has focused on a data record, responsive to determining that the user has focused on a data record, perform a third update operation on the item of data, wherein the third update operation uses context information for the data record, determine whether a search result record is selected, responsive to determining that the search result record is selected, perform a fourth update operation on the item of data, wherein the fourth update operation uses context information for the search result record, determine whether the user interface is currently displayed, responsive to determining that the user interface is currently displayed, display on the user interface the item of data, wherein the displaying comprises displaying the item of data after the updating is complete, responsive to the second change in context, cause the functional control module to update the first display window, and if said second change in context is a selection of a search result, store a past version of the context information for retrieval, and the maintaining instructions are executed such that the context information is maintained persistently until the second change in context, wherein variables representing a phone number and a number of calls in a queue are passed as arguments to update the item of data.

* * * * *

UNITED STATES PATENT AND TRADEMARK OFFICE
CERTIFICATE OF CORRECTION

| | |
|---|---|
| PATENT NO. | : 7,836,403 B2 |
| APPLICATION NO. | : 10/185180 |
| DATED | : November 16, 2010 |
| INVENTOR(S) | : Viswanathan et al. |

It is certified that error appears in the above-identified patent and that said Letters Patent is hereby corrected as shown below:

In the Claims

Column 17, line 2, cancel the text beginning with "1. A method comprising:" to and ending with the text "is currently displayed." in column 17, line 27, and insert the following claim:

--1. A method comprising:

pushing context information, in response to a first change in context; and maintaining the context information until a second change in context occurs, wherein the context information is configured to be displayed in a first display window of a user interface of a client, the client is configured to be communicatively coupled to a server, the maintaining comprises updating the context information in response to a change in the context information, wherein a determination is made with respect to whether an inbound call is able to be automatically associated with a contact record, if said determination indicates that said inbound call is unable to be automatically associated with any contact record, a search is enabled, Signed and Sealed this
Twenty-fourth Day of February, 2015

Michelle K. Lee
*Deputy Director of the United States Patent and Trademark Office*

CERTIFICATE OF CORRECTION (continued)
U.S. Pat. No. 7,836,403 B2 said search is entered through the user interface, a search result is produced by said search, said search result is a result contact record, said search result is displayed in response to an actuation of a user control, said second change in context is a selection of said search result, the updating is configurably limited to a set of fields associated with said first display window, and a past version of the context information is configured to be available for a subsequent retrieval, and the server is configured to perform the pushing to a functional control module, wherein the functional control module is configured to be executed on the client, and the functional control module is configured to provide a notification of an incoming communication event associated with the second change in context, and perform the maintaining without respect to whether the first display window is currently displayed.--

Column 21, lines 56, cancel the text beginning with "21. A computer-readable medium comprising:" to and ending with the text "the command definition." in column 22, line 21, and insert the following claim:

--21. A computer-readable medium comprising:

an application program interface comprising a command definition for a pushing command to push context information, in response to a first change in context, wherein the context information is configured to be displayed in a first display window of a user interface of a client, and a maintaining command to maintain the context information for display, until a second change in context occurs, wherein the client is communicatively coupled to a server, the maintaining command is configured to cause updating of the context information, in response to a change in the context information, wherein a determination is made with respect to whether an inbound call is able to be automatically associated with a contact record, if said determination indicates that said inbound call is unable to be automatically associated with any contact record, a search is enabled, said search is entered through the user interface, a search result is produced by said search, said search result is a result contact record, said search result is displayed in response to an actuation of a user control, said second change in context is a selection of said search result, the updating is configurably limited to a set of fields associated with said first display window, and a past version of the context information is configured to be available for a subsequent retrieval,

CERTIFICATE OF CORRECTION (continued)
U.S. Pat. No. 7,836,403 B2 the pushing command and the maintaining command are configured to be executed on the server, and the pushing command and the maintaining command are configured to cause the server to perform the pushing to a functional control module, wherein the functional control module is configured to be executed on the client, the functional control module is configured to perform the updating, and the functional control module is configured to provide a notification of an incoming communication event associated with the second change in context, and perform the maintaining without respect to whether the first display window is currently displayed; and instructions to implement the command definition.--

Column 23, line 7, cancel the text beginning with "23. A user interface module" to and ending with the text "displayed." in column 23, line 35, and insert the following claim:

--23. A user interface module embodied in a computer-readable medium, wherein the user interface module comprises:

pushing instructions to push context information, in response to a first change in context, wherein the context information is configured to be displayed in a first display window of a user interface of a client; and maintaining instructions to maintain the context information, until a second change in context occurs, wherein the maintaining instructions are configured to cause updating of the context information in response to a change in the context information, wherein a determination is made with respect to whether an inbound call is able to be automatically associated with a contact record, if said determination indicates that said inbound call is unable to be automatically associated with any contact record, a search is enabled, said search is entered through the user interface, a search result is produced by said search, said search result is a result contact record, said search result is displayed in response to an actuation of a user control said second change in context is a selection of said search result, the updating is configurably limited to a set of fields associated with said first display window, and a past version of the context information is configured to be available for a subsequent retrieval, the client is communicatively coupled to a server, the pushing instructions and the maintaining instructions are configured to be executed on the server, and the pushing instructions and the maintaining instructions are configured to perform the pushing to a functional control module, wherein the functional control module is configured to be executed on the client, the functional control module is configured to perform the updating, and the functional control module is configured to provide a notification of an incoming communication event associated with the second change in context, and perform the maintaining without respect to whether the first display window is currently displayed.--